US006017611A

United States Patent [19]

Cheng et al.

[11] Patent Number: 6,017,611

[45] Date of Patent: Jan. 25, 2000

[54] INK JET PRINTABLE SUPPORT MATERIAL FOR THERMAL TRANSFER

[75] Inventors: Hua Cheng, North Syracuse; William Quartz, Pulaski; Rodney Richmond, Henderson, all of N.Y.; Ajay Yashvantrao Houde, Brown Deer, Wis.; Jack Kantrowitz, Miami, Fla.

[73] Assignee: Felix Schoeller Technical Papers, Inc., Pulaski, N.Y.

[21] Appl. No.: 09/026,932

[22] Filed: Feb. 20, 1998

[51] Int. Cl.[7] .......... B32B 3/00

[52] U.S. Cl. .......... 428/195; 428/327; 428/331; 428/474.4; 428/522; 428/537.5; 347/2; 347/105

[58] Field of Search .......... 428/195, 327, 428/331, 474.4, 522, 537.5; 347/2, 105

[56] References Cited

U.S. PATENT DOCUMENTS

| | | | |
|---|---|---|---|
| 4,785,313 | 11/1988 | Higuma et al. | 347/105 |
| 5,006,502 | 4/1991 | Fujimura et al. | 503/227 |
| 5,314,862 | 5/1994 | Hirota et al. | 503/227 |
| 5,411,787 | 5/1995 | Kulkarni et al. | 428/195 |
| 5,475,480 | 12/1995 | Cahill et al. . | |
| 5,488,907 | 2/1996 | Xu et al. | 101/488 |
| 5,501,902 | 3/1996 | Kronzer | 428/323 |
| 5,560,982 | 10/1996 | Sato | 428/216 |
| 5,605,725 | 2/1997 | Macauley et al. | 427/557 |
| 5,695,588 | 12/1997 | Daems et al. | 156/247 |
| 5,714,287 | 2/1998 | Malhotra | 430/47 |
| 5,744,273 | 4/1998 | Malhotra | 430/97 |
| 5,798,179 | 8/1998 | Kronzer | 428/411.1 |
| 5,837,375 | 11/1998 | Brault et al. | 428/411.1 |
| 5,897,940 | 4/1999 | Malhotra | 428/212 |
| 5,897,961 | 4/1999 | Malhotra et al. | 428/537.5 |
| 5,906,905 | 5/1999 | Malhotra | 430/97 |

FOREIGN PATENT DOCUMENTS

| | | | |
|---|---|---|---|
| 29902145 | 5/1999 | Germany | B41M 5/28 |
| 07145576 | 8/0000 | Japan | B41M 3/12 |
| 0127090 | 10/1976 | Japan | B41M 3/12 |
| 60015193 | 1/1985 | Japan | B41M 5/00 |
| 01295890 | 5/1988 | Japan | B41M 5/40 |
| 0095214 | 4/1989 | Japan | B41M 5/00 |
| 0277231 | 10/1989 | Japan | B41M 5/40 |
| 0041376 | 2/1995 | Japan | B41M 5/40 |
| 0282574 | 10/1996 | Japan | B41M 5/00 |
| 11001069 | 1/1999 | Japan | B41M 5/40 |

*Primary Examiner*—Terrel Morris
*Assistant Examiner*—Arti R. Singh
*Attorney, Agent, or Firm*—Cook, Alex, McFarron, Manzo, Cummings & Mehler, Ltd.

[57] ABSTRACT

A printable transfer material for thermal image transfer onto a flat porous surface comprising a base, a release layer and an image receiving layer which contains a hydrophilic binder, a fine-grained thermoplastic polymer and silica.

12 Claims, No Drawings

INK JET PRINTABLE SUPPORT MATERIAL FOR THERMAL TRANSFER

The present invention concerns a printable image support material for thermal image transfer to flat porous surfaces, especially an ink jet printable thermal transfer paper.

There are various processes to transfer individual, personal images or motives to textiles. These motives are printed to release papers or so-called transfer papers with the help of various printing methods such as thermal dyestuff diffusion transfer method (D2T2), ink jet printing method or toner method (electrophotography) and subsequently further transferred to the textile item under heat and pressure while the paper backing is pulled off.

One of these methods is described in DE 25 53 654 A1. It concerns the creation of durable images on cloth created in xerographic manner. This task is solved by the fabrication of a silicone-coated sheet arranged on which is a coating layer on which the image is xerographically created. The disadvantage of this transfer paper with silicone coating is that during the releasing process after the image transfer silicone traces remain adhering to the fibers of the textile surface.

EP 0 479 882 A1 describes a process and the pertinent transfer paper for the transfer of images to a porous surface, wherein the paper consists of a coated paper containing a PE layer. The images to be transferred are printed on the paper by dry copying and subsequently transferred to the textile surface under the action of heat and pressure. The disadvantage of this paper is the inadequate color density of the images transferred to the backing.

In U.S. Pat. No. 5,501,902 a printable paper is presented which contains a first polymer layer and an ink jet printable second layer with film-forming binder, a fine-particulate thermoplastic polymer and ink viscosity modifying agent. The images transferred to the textile surface with the help of this transfer paper under the influence of heat and pressure exhibit a high color density while the polymer layer laminate transferred with the images adheres very well to the textile surface. The disadvantage of this transfer paper is the use of the viscosity modifying agent, which generally is a hydrophile agent such as polyethylene glycol or polyvinyl alcohol. This agent has a positive effect on the binding ability but, because of its water solubility, has negative effects on the fastness to washing.

In EP 0 505 049 an ink jet printable paper is suggested which in the receiving layer contains a thermoplastic binder in addition to a finely particulate thermoplastic polymer. However, the images transferred with the help of this paper exhibit an inadequate color density and definition on the textile surface.

It is therefore the object of the present invention to develop an image support material with the aid of which images generated by means of the ink jet printing method can be transferred to flat porous surfaces, especially textile surfaces, with high color density and which additionally exhibit an improved fastness to washing.

This object is solved by an image support material which is characterized by a support, an intermediate release layer and an image receiving layer containing a hydrophilic binder, finely particulate thermoplastic polymer and silica.

The binder employed in the image receiving layer according to the invention is preferably a hydrophilic polymer, for example polyvinyl alcohol, polyethylene glycol, polyacrylamide, polyacrylic acid, polyvinyl pyrolidon, maleic acid copolymers, water-soluble polyurethanes, methyl cellulose, ethyl cellulose, carboxymethyl cellulose, hydroxyethyl cellulose, starch, starch derivatives, casein, gelatin or mixtures of these polymers. Polyvinyl alcohol is particularly well suited.

The quantity of the hydrophilic binder in the receiving layer is 10 to 40% by weight, especially 15 to 35% by weight, based on the weight of the dry layer.

The fine-particulate thermoplastic polyoletins contained in the receiving layer according to the invention is preferably a polymer from the group or polyolefins, olefin copolymers, polyester, cellulose ester or polyamides. Particularly well suited are polyamides or polyolefines with a mean particle size of up to 30 $\mu$m, especially 5 to 25 $\mu$m and a melting temperature of 110 to 180° C.

The quantity of the fine-particulate polymer is 20 to 50% by weight, especially 20 to 40% by weight, based on the weight of the dry layer.

The use of silica in the receiving layer results in a particularly high definition of the images transferred to the textile surface when compared with the materials known from the state of the art. The probable reason for this is that contrary to the known materials not the polymer pigment is responsible for the color absorption but the inorganic silica pigment. The main purpose of the fine-particulate polymer in the image receiving layer according to the invention is the enveloping of the silica particles impregnated with the ink. The silica quantity is 5 to 20% by weight, especially 5 to 15% by weight, based on the dry layer.

Particularly good results are achieved with a quantity ratio of silica/thermoplastic polymer of 1:1 to 1:10.

The receiving layer according to the invention can additionally contain a softening polymer. Particularly well suited for this are polyamide compounds such as sulfonamides the quantity of which can be 1 to 20% by weight, especially 5 to 15% by weight.

In a special embodiment of the invention the receiving layer may contain an acrylic copolymer. Especially an acrylic copolymer with carboxyl groups in the side chains of the polymer may act as a dispersing agent for the fine-particulate polymer. The quantity of the acrylic copolymer can be up to 3% by weight, especially 0.5 to 2% by weight.

The image receiving layer is applied using a aqueous coating solution. All conventional application and dosing methods can be used for this purpose.

The coating weight of the image receiving layer may be 1 to 25 g/m$^2$, especially 2 to 15 g/m$^2$.

A plastic foil or an uncoated or surface-modified paper, for instance coated or siliconized paper, can be used as support material. Particularly well suited is a hard sized neutral base paper with a basis weight of 60 to 200 g/m$^2$. The base paper can be additionally surface-treated with a special coating in a quantity not exceeding 5 g/m$^2$, especially 1 to 3 g/m$^2$.

In a further embodiment of the invention a thermoplastic layer is arranged between the support material and the image receiving layer preferably containing an ethylene copolymer, an ethylene copolymer mixture or an ionomeric resin or alternatively a mixture of these polymers or copolymers.

The ethylene copolymer in particular contains 10 to 35 mol % of a further monomer. In particular, the ethylene copolymer can be an ethylene/vinyl acetate or an ethylene/(meth)acrylic acid or an ethylene/(meth)acrylic acid alkyl ester copolymer.

The thermoplastic layer is applied to the support material with the help of an extrusion coating plant. The coating weight of the layer can be 5 to 50 g/m$^2$, in particular 20 to 40 g/m$^2$.

The surface of the image support material according to the invention can be printed with the help of various printing methods, in particular with the help of ink jet printing methods, with any desired motif which can subsequently be transferred to all synthetic or natural fabrics but also to other flat items. For this purpose the image support material printed with a motif is brought in contact with a flat surface.

The transfer is accomplished under the action of heat (130–200° C.) and pressure (1.3 to 500 kN/$m^2$). Thereafter, the support will be pulled off the surface.

The following examples serve to explain the invention in more detail.

EXAMPLES 1–3

Following a corona pre-treatment, the front side of a neutral sized basic paper with a basis weight of 96 g/$m^2$ was extrusion-coated with an ethylene copolymer with 24 mol % vinyl acetate in a quantity of 30 g/$m^2$ and subsequently coated with watery dispersions, the compositions of which in the dried state are shown in the following table.

| | Proportions in % by weight | | |
|---|---|---|---|
| Constituents | 1 | 2 | 3 |
| Polyvinyl alcohol | 34.22 | 34.22 | 17.11 |
| Polyvinyl pyrrolidone | — | — | 17.11 |
| Fine-particulate polyethylene | 37.64 | — | 37.64 |
| Fine-particulate polyamide | — | 37.64 | — |
| Silica | 14.67 | 14.67 | 14.67 |
| Sulfonamide | 11.61 | 11.61 | 11.61 |
| Acrylic/sulfonic-copolymer | 1.86 | 1.86 | 1.86 |
| Coating weight, g/$m^2$ | 8 | 10 | 12 |

Using a Canon 620 ink jet printer, a test image in the basic colors yellow, cyan, magenta and black was produced on the papers according to the invention. The printed paper was subsequently brought in contact with a textile surface (fabric made of 100% cotton) in a press in which the transfer of the image to the surface was effected with heat (180° C.) and pressure (345 kN/$m^2$).

After the transfer the paper support was pealed off. In a further step the printed textile surface was washed at 30° C. with conventional detergent and inspected.

Comparative Examples

A base paper with a basis weight of 96 g/$m^2$ was extrusion-coated with ethylene/vinyl acetate in a first step and then coated with aqueous coating masses in a second step, the compositions of which in the dry state are shown in the following table.

| | Proportions in % by weight | |
|---|---|---|
| Constituents | V1 | V2 |
| Polyacrylate (Rhoplex ®) | 20 | 20 |
| Fine-particulate polyamide | 75 | — |
| Fine-particulate high molecular polyethylene | — | 70 |
| Amide/epichlorhydrin-copolymer | 5 | 5 |
| Viscosity-modifying agent polyethylene glycol | — | 5 |
| Coating weight, g/$m^2$ | 10 | 10 |

Test Results

The papers produced according to the examples were printed with a test image using an ink jet printer Canon 620 and inspected with regard to the bleed behavior. Bleeding is the intermingling of the ink at the edges of adjoining color surfaces which was visually rated with the marks 1 to 10 (very good to very poor).

Subsequently the papers were brought into contact with a textile base and the image transferred from the paper to the textile base under the action of heat and pressure.

A further step served to measure the color density on the printed textile base. The density measurements were conducted prior to and after a washing process with a conventional detergent at 30° C. The measurements were conducted with the Gretag densitometer Type 186 D for the basic colors yellow, cyan, magenta and black. A mean color density was calculated from the density values for the individual colors.

We claim:

1. An ink jet printable image support material for thermal image transfer to a flat porous surface, comprising a support material, an intermediate release layer on said support material and an image receiving layer on said intermediate layer, wherein said image receiving layer contains a hydrophilic binder, a finely particulate thermoplastic polymer and silica.

2. The printable material according to claim 1, wherein the finely particulate thermoplastic polymer is a polyamide or a polyolefin.

3. The printable material according to claim 1, wherein the particle size of the finely particulate thermoplastic is between 5 and 25 $\mu$m.

4. The printable material according to claim 1, wherein the finely particulate thermoplastic polymer has a melting point between 110 and 180° C.

5. The printable material according to claim 1, wherein the thermoplastic polymer is contained in the receiving layer in an amount of from 20 to 50 weight percent, based on the weight of the dried layer.

6. The printable material according to claim 1, wherein the binder is polyvinyl alcohol.

7. The printable material according to claim 1, wherein the binder is contained in an amount of from 10 to 40 weight percent.

8. The printable material according to claim 1, wherein silica is contained in the receiving layer in an amount of from 5 to 20 weight percent.

9. The printable material according to claim 1, wherein the weight ratio of silica to the finely particulate thermoplastic polymer is within a range of from 1:1 to 1:10.

10. The printable material according to claim 1, wherein the receiving layer contains a sulfonamide.

11. The printable material according to claim 1, wherein the amount of the sulfonamide is within a range of from 5 to 15 weight percent.

12. The printable material according to claim 1, wherein the support material is a uncoated or surface modified base paper.

* * * * *

UNITED STATES PATENT AND TRADEMARK OFFICE

CERTIFICATE OF CORRECTION

PATENT NO. : 6,017,611
DATED : January 25, 2000
INVENTOR(S) : Hua Cheng et al.

It is certified that error appears in the above-identified patent and that said Letters Patent is hereby corrected as shown below:

<u>Column 2,</u>
Line 7, "change" polyoletins" to -- polyolefins --.
Line 11, "change" polyolefines" to -- polyolefins --.

<u>Column 4,</u>
Line 55, change "1" to -- 10 --.
Line 59, change "a" to -- an --.

Signed and Sealed this

Twenty-sixth Day of March, 2002

*Attest:*

JAMES E. ROGAN

*Attesting Officer*

*Director of the United States Patent and Trademark Office*